United States Patent
Lee et al.

(10) Patent No.: US 10,096,989 B2
(45) Date of Patent: Oct. 9, 2018

(54) HIGH-VOLTAGE DC CURRENT BREAKER AND HIGH-VOLTAGE DC CURRENT BREAKING METHOD

(71) Applicant: KOREA ELECTROTECHNOLOGY RESEARCH INSTITUTE, Changwon-si, Kyongsangnam-do (KR)

(72) Inventors: Woo Young Lee, Gimhae-si (KR); Sang Hun Park, Changwon-si (KR); Ki Dong Song, Changwon-si (KR); Hyun Jae Jang, Busan (KR); Jin Kyo Chong, Changwon-si (KR)

(73) Assignee: KOREA ELECTROTECHNOLOGY RESEARCH INSTITUTE, Changwon-si, Kyongsangnam-Do (KR)

( * ) Notice: Subject to any disclaimer, the term of this patent is extended or adjusted under 35 U.S.C. 154(b) by 219 days.

(21) Appl. No.: 15/027,744

(22) PCT Filed: Sep. 5, 2014

(86) PCT No.: PCT/KR2014/008403
§ 371 (c)(1),
(2) Date: Apr. 7, 2016

(87) PCT Pub. No.: WO2015/053484
PCT Pub. Date: Apr. 16, 2015

(65) Prior Publication Data
US 2016/0285250 A1    Sep. 29, 2016

(30) Foreign Application Priority Data

Oct. 7, 2013   (KR) .................. 10-2013-0119060

(51) Int. Cl.
*H02H 3/087* (2006.01)
*H01H 9/54* (2006.01)
*H01H 33/59* (2006.01)

(52) U.S. Cl.
CPC .............. *H02H 3/087* (2013.01); *H01H 9/54* (2013.01); *H01H 9/542* (2013.01); *H01H 9/547* (2013.01);
(Continued)

(58) Field of Classification Search
CPC ....................................................... H02H 3/087
(Continued)

(56) References Cited

U.S. PATENT DOCUMENTS

| 4,005,340 A | * | 1/1977 | Hartel | ................ H01H 9/54 307/135 |
| 5,517,378 A | * | 5/1996 | Asplund | ............ H01H 33/596 361/3 |
| 2013/0020881 A1 | * | 1/2013 | Panousis | ............ H01H 33/596 307/113 |

FOREIGN PATENT DOCUMENTS

EP   0 749 140    12/1996
EP   0 867 998    3/2007
(Continued)

OTHER PUBLICATIONS

Peter van Gelder et al., "Zero Volt Switching Hybrid DC Circuit Breakers"; Conference Record of the 2000 IEEE Industry Applications Conference, vol. 35, Oct. 8, 2000, pp. 2923-2927.
(Continued)

*Primary Examiner* — Thienvu Tran
*Assistant Examiner* — Lucy Thomas
(74) *Attorney, Agent, or Firm* — Kile Park Reed & Houtteman PLLC

(57) ABSTRACT

Provided is a DC current breaker having a high-speed breaking function appropriate to a voltage-type converter and a DC current breaking method. In addition, provided is a DC current breaker and a DC current breaking method capable of reducing cost of the breaker and securing economical competiveness by using a relatively simple configuration. The DC current breaker for breaking a DC current at the time of occurrence of an accident includes: a main conduction unit including three high-speed mechanical switches installed to be connected in series to a main conduction path for conducting a normal-operation-state current; a power semiconductor switch installed to be connected in parallel to one high-speed mechanical switch
(Continued)

among the high-speed mechanical switches installed in the main conduction unit for current breaking of the main conduction unit; a capacitor installed on a circuit connected in parallel to the main conduction path; and a surge arrester installed to be connected in parallel to the capacitor connected in parallel to the main conduction path. The DC current breaking method uses the DC current breaker.

6 Claims, 5 Drawing Sheets

(52) U.S. Cl.
CPC ..... *H01H 33/596* (2013.01); *H01H 2009/543* (2013.01); *H01H 2009/544* (2013.01); *H01H 2009/546* (2013.01)

(58) Field of Classification Search
USPC .......................................................... 361/63
See application file for complete search history.

(56) References Cited

FOREIGN PATENT DOCUMENTS

| EP | 2 088 606 | 8/2009 |
|----|-----------|--------|
| JP | 57-162223 | 10/1982 |
| KR | 2003-0061881 | 7/2003 |
| KR | 10-2012-0079156 | 7/2012 |
| KR | 10-2012-0089751 | 8/2012 |
| WO | 2011/057675 | 5/2011 |

OTHER PUBLICATIONS

Extended European Search report corresponding to European Patent Application No. EP14852914.2, dated Sep. 20, 2016.
International Search Report with English translation for International Application No. PCT/KR2014/008403, dated Jan. 14, 2015.

\* cited by examiner

HIGH-VOLTAGE DC CURRENT BREAKER AND HIGH-VOLTAGE DC CURRENT BREAKING METHOD

TECHNICAL FIELD

The present invention relates to a DC current breaker and a DC current breaking method, and more particularly, to a current breaker and a current breaking method capable of speedily breaking a high-voltage DC current in a power transmission/transformation line using a voltage-type converter requiring a greatly short breaking time in comparison with a current-type converter of the related art.

BACKGROUND ART

As a voltage-type DC grid is expected to be needed, a short accident current breaking time is required. As measures to the requirement, WO 2011/057675 A1 discloses a hybrid DC breaker by ABB in 2011.

The disclosed hybrid DC breaker is configured as a combination of mechanical switches and power semiconductor switches, so that short breaking time and relatively-small normal-state conduction loss in accordance with the requirements may be secured.

In the structure of the hybrid DC breaker, since a portion of performing main breaking of a current commutated in the main conduction path is configured with a power semiconductor breaker, power loss does not occur in a normal conduction state. However, since a rated voltage thereof needs to be higher than a rated voltage of an application system, in the case where the hybrid DC breaker is applied to a super-high-voltage DC transmission (HVDC, High Voltage Direct Current) system, a large number of power semiconductor elements are needed. There is a problem in that this causes the structure of the breaker system to be complicated, and thus, cost is largely increased. Since the power semiconductor breaker has directionality in current conduction, in the case where the bidirectional breaker is configured, economical burden is further increased. In addition, although an auxiliary power semiconductor switch applied to a main conduction unit is also configured with a small number of power semiconductors, since the switch performs a function of conducting a rated current in a normal state, in comparison with a mechanical switch, power loss occurs in the power semiconductor switch, and a cooling system for the power semiconductor switch becomes a burden. In addition, since a capacity for a surge current at the time of closing is limited, there is a problem in that many factors needs to be considered at the time of application to actual system.

DISCLOSURE

Technical Problem

The present invention is to provide a DC current breaker having a simple structure where a main conduction path is configured with three high-speed mechanical switches.

In addition, the present invention is to provide a DC current breaker securing a desired breaking operation speed as well as having the above-described simple structure.

In addition, the present invention is to provide a DC current breaker having small power loss and capable of being adaptively applied to various systems.

Technical Solution

According to an aspect of the present invention, there is provided a DC current breaker for breaking a DC current at the time of occurrence of an accident, including: a main conduction unit including three high-speed mechanical switches installed to be connected in series to a main conduction path for conducting a normal-operation-state current; a power semiconductor switch installed on a primary commutate circuit connected in parallel to one mechanical switch among the high-speed mechanical switches included in the main conduction path; a capacitor installed on a secondary commutate circuit which is a circuit connected in parallel to the two high-speed mechanical switches connected in series to each other in the main conduction path; and a surge arrester installed on a tertiary commutate circuit which is a circuit connected in parallel to the capacitor on the circuit connected in parallel to the two high-speed mechanical switches connected in series to each other in the main conduction path.

In addition, in the DC current breaker, the mechanical switch of a main conduction circuit connected in parallel to the primary commutate circuit connected to the power semiconductor switch is installed as a mechanical switch having a rated voltage lower than rated voltages of the other two mechanical switches connected in series to each other.

In addition, in the DC current breaker, the power semiconductor switch installed on the primary commutate circuit is applied with a forward voltage lower than an arc voltage at the time when the mechanical switch connected in parallel to the power semiconductor switch is opened in a conduction state, so that a current of the main conduction unit is easily commutated to the power semiconductor switch.

In addition, in the DC current breaker, the mechanical switch of the main conduction circuit connected in parallel to the power semiconductor switch of the primary commutate circuit is a monostable switch and has a function of receiving a trip signal of the DC current breaker to start an opening operation and automatically returning to a closed state after the time point when the current of the main conduction unit is completely commutated to the secondary commutate circuit, and an opening response characteristic thereof is faster than those of the other two high-speed mechanical switches connected in series to each other, so that an arc voltage is speedily increased.

In addition, in the DC current breaker, the capacitor is installed on a circuit branched from the main conduction path at the rear stage of the close/open switch.

In addition, in the DC current breaker, the capacitor has electrostatic capacitance so that, when a transient voltage applied at the time point when a current of the main conduction path is broken by the power semiconductor switch is shared by the protection switch and the commutate switch, the voltage across the commutate switch does not exceed a rated withstand voltage of the power semiconductor switch which is connected in parallel to the commutate switch.

In addition, the DC current breaker further includes a discharge unit for discharging a voltage charged in the capacitor after a DC current breaking operation is finally finished by the close/open switch.

In addition, in the DC current breaker, the discharge unit is configured to include a discharge switch and a discharge resistor which are connected in series to each other on a discharge path connected in parallel to the circuit where the capacitor is installed.

In addition, in the DC current breaker, the power semiconductor switch of the primary commutate circuit is formed with a single one-directional conduction switch or is formed by connecting two one-directional conduction switches reversely in series to each other and connecting free wheeling diodes in parallel to the respective one-directional conduction switches.

According to another aspect of the present invention, there is provided a DC current breaking method for breaking a DC current at the time of occurrence of an accident, by using a DC current breaker including: a main conduction unit including three high-speed mechanical switches of a candidate charging site, a protection switch, and a commutate switch which are installed to be connected in series to a main conduction path for conducting a normal-operation-state current; a power semiconductor switch on a circuit connected in parallel to the commutate switch of the main conduction unit; a capacitor installed to be connected in parallel to the protection switch and the commutate switch on a circuit in parallel to the main conduction unit; and a surge arrester installed to be connected in parallel to the capacitor on the circuit connected in parallel to the main conduction path, wherein the DC current breaking method includes: in a normal operation state that a normal current flows through only the three mechanical switches of the main conduction path, if a trip signal is received, opening the three high-speed mechanical switches; after arc is generated between electrodes the commutate switch, allowing a line current flowing the commutate switch to be commutated to the power semiconductor switch installed on a primary commutate circuit; when a distance between electrodes of the protection switch becomes a predetermined distance or more, turning off the power semiconductor switch so that the current of the main conduction path is commutated to a secondary commutate circuit to charge the capacitor, and when a charge voltage of the capacitor is increased up to a discharge start voltage of the surge arrester, allowing the surge arrester installed on a tertiary commutate circuit to start discharging, so that the line current flows through the surge arrester and, thus, current breaking is performed.

In addition, in the DC current breaking method, a time point when the power semiconductor switch is turned off according to a control signal of a control unit and, thus, a current flowing through the power semiconductor switch is broken is set to a time point when a distance between electrodes of the protection switch where arc is generated becomes a distance between the electrodes where insulation with respect to a transient voltage generated by the arc can be recovered.

In addition, in the DC current breaking method, after the close/open switch is opened, a discharge unit for discharging the voltage charged in the capacitor is operated.

In addition, in the DC current breaking method, the discharge unit is configured to include a discharge switch and a discharge resistor which are connected in series to each other on a discharge path connected in parallel to the circuit where the capacitor is installed, and the discharge switch is closed and, after that, opened so that the voltage charged in the capacitor is discharged through the discharge path.

In addition, in the DC current breaking method, after the protection switch of the main conduction unit is first closed, the close/open switch is closed, so that the closing of the DC current breaker is performed.

Advantageous Effects

According to a DC current breaker and a DC current breaking method of the present invention, since a power semiconductor breaking unit of an existing DC current breaker in the related art where a main breaking function is performed in a power semiconductor breaking manner is replaced with a capacitor, there is an advantage in that the configuration is simplified and reliability is improved and cost is reduced.

In addition, since a main conduction unit is configured with only mechanical switches, there is an advantage in that power loss in a normal state is greatly lowered in comparison with the case where a mechanical switch and a power semiconductor switch are combined, and there are advantages in that noise is decreased, and a cooling system of the power semiconductor switch which causes a reliability to be lowered for a long time operation can be simplified.

In addition, the configuration of the mechanical switch of the main conduction unit may improve a surge current capability at the time of closing of the DC current breaker, and thus, in an existing manner where a mechanical switch and a power semiconductor switch are combined, the limitation to turn-on characteristics of the DC current breaker can be released from the turn-on limit of the power semiconductor switch.

In addition, a DC current breaker according to the present invention is a hybrid DC current breaker having a high-speed breaking characteristic, and there is an advantage in that the DC current breaker can be applied to a high-voltage DC current line operated in a voltage-type converter in various manners.

BEST MODE

Figure 1:
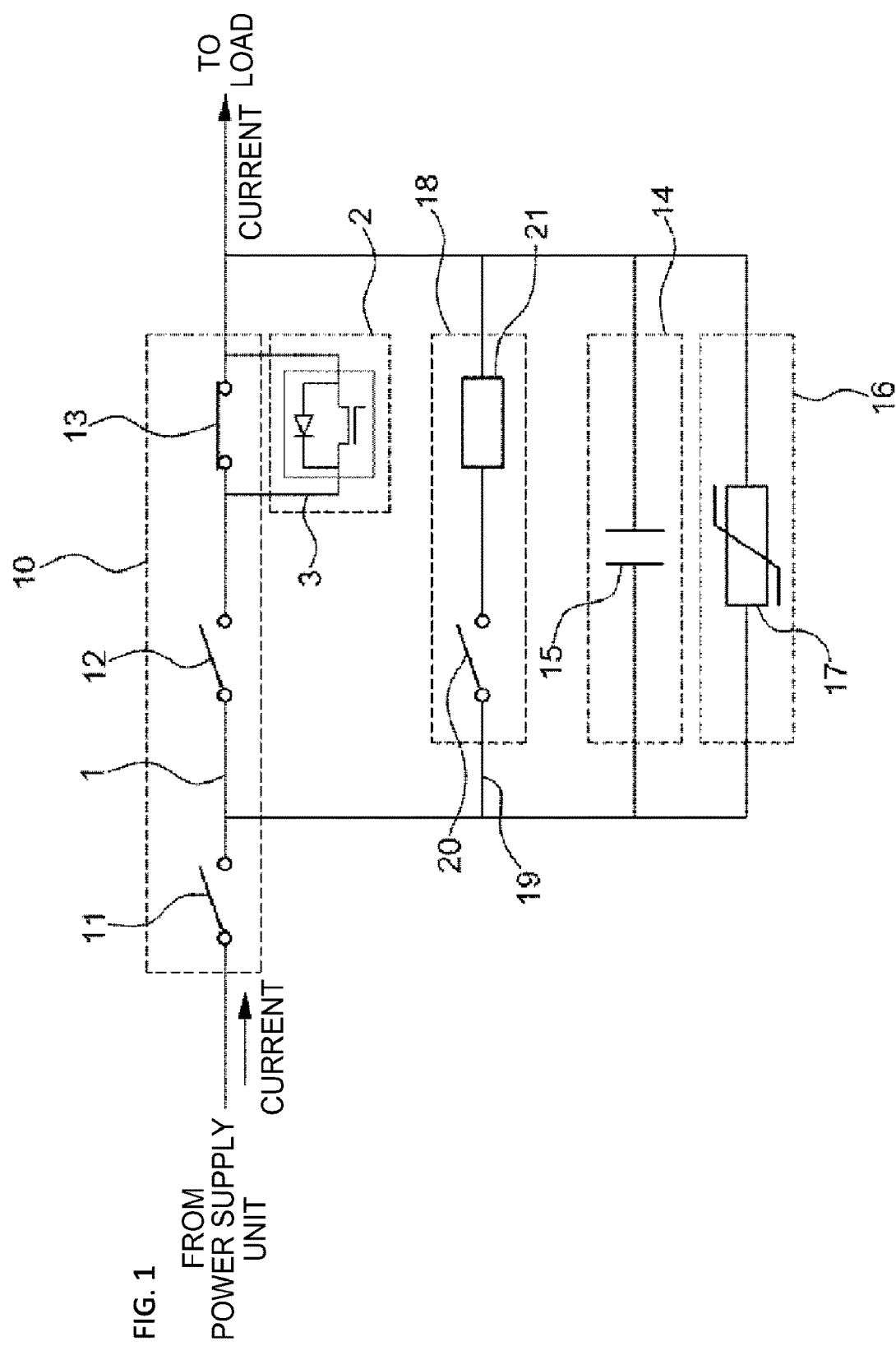
FIG. 1 is a circuit diagram illustrating a configuration of a DC current breaker according to an embodiment of the present invention.

Hereinafter, exemplary embodiments of the present invention will be described with respect to the attached drawings in detail so that the ordinarily skilled in the related art can easily embody the present invention.

The present invention relates to a DC current breaker having a high-speed breaking function and a DC current breaking method, and particularly, to a hybrid-type high-voltage DC current breaker having a high-speed breaking characteristic required for a high-voltage DC line operated as a voltage-type converter and a method of operating the DC current breaker.

In addition, the present invention is to provide a DC current breaker and a DC current breaking method capable of reducing conduction loss in a normal state, having a relatively simple configuration to reduce cost of the breaker, and thus, securing economical competiveness, and particularly, to provide a configuration of a DC current breaker where a main breaking unit is configured with only high-speed mechanical switches without including a power semiconductor switch and where a DC current breaking method thereof is novel and distinguishable in comparison with a complicated, high-expensive DC current breaking method in the related art where a main breaking function is performed in a breaking method by a power semiconductor switch and a method of operating the configuration.

Therefore, in the configuration of the DC current breaker and the method of operating the configuration of the present invention, in order to reduce power loss in a normal state occurring in the related art where a power semiconductor switch is included in a main conduction unit, the main conduction unit is configured with high-speed mechanical switches; and in order to minimize a solid-state breaking function performed by a power semiconductor element which causes an increase in cost and complicatedness, the power semiconductor element is replaced with a capacitor.

First, with respect to the configuration of the DC current breaker, in the DC current breaker according to the present invention, a main conduction unit for conducting a normal current is configured by connecting three high-speed mechanical switches in series to each other so that a DC current breaking function is performed at a high speed between a power supply unit and a load, and a power semiconductor switch is connected in parallel to one high-speed mechanical switch included in the main conduction unit between the power supply unit and the load.

The three high-speed mechanical switches installed in the main conduction unit are arranged in the following order. The first mechanical switch is a mechanical switch (hereinafter, referred to as a close/open switch) for closing and opening a circuit; the second mechanical switch is a mechanical switch (hereinafter, referred to as a protection switch) performing a function of protecting the mechanical switch connected to the rear stage and the power semiconductor switch connected in parallel to the mechanical switch from a transient voltage generated at the time of current breaking; and the third mechanical switch is a mechanical switch (hereinafter, referred to as a commutate switch) of commutating the breaking current to the power semiconductor switch installed in a primary commutate circuit connected in parallel to the commutate switch at the time of current breaking.

Among the mechanical switches, the close/open switch and the protection switch are bistable switches which are operated at a high speed and have the same form as a typical switch where on and off states are stable. However, the commutate switch is a high-speed monostable switch of which contacts are opened for only a certain instantaneous time when a trip signal is applied and, after that, the contacts are automatically closed. Therefore, after the time point when the breaking current is completely commutated to the secondary commutate circuit where the capacitor is installed, the commutate switch is returned from the opened state to the closed state. At this time, all the voltages applied to the DC current breaker are configured to be withstood by the protection switch.

In addition, the capacitor is installed in the circuit connected in parallel to the commutate switch and the protection switch in parallel to the main conduction unit functions as a secondary commutate circuit if the current of the main conduction path is broken, and in order to release energy accumulated in a line, a tertiary commutate circuit is configured by installing a surge arrester in the circuit connected in parallel to the capacitor.

The DC current breaker according to the present invention will be described more in detail reference to the drawings. FIG. 1 is a circuit diagram illustrating a configuration of the DC current breaker according to an embodiment of the present invention, particularly, a configuration of an embodiment with respect to one-directional current conduction.

As illustrated, a main conduction unit 10 is configured by installing three high-speed mechanical switches to be connected to each other in series in circuit 1 (hereinafter, referred to as a main conduction path) used for conduction of a normal-operation-state current between a power supply unit and a load.

In addition, a power semiconductor switch is installed on a circuit connected in parallel to a commutate switch on the main conduction path. During the current breaking, the current flowing through the commutate switch is commutated to the power semiconductor switch, and after that, the current of the main conduction unit is broken by a breaking function of the power semiconductor switch.

In addition, a capacitor 15 is installed on a circuit 14 connected in parallel to the main conduction path 1 between the power supply unit and the load. A discharge unit 18 is configured by installing a mechanical switch 20 (hereinafter, referred to as a discharge switch) and a discharge resistor 21 to be connected to each other in series on a circuit 19 (hereinafter, referred to as a discharge path) connected in parallel to the circuit 14 where the capacitor 15 is installed.

Herein, the capacitor 15 is installed on the circuit 14 branched from the main conduction path 1 at the rear stage of a close/open switch 11 so as to be connected in parallel to the protection switch 12 and the commutate switch 13 of the main conduction unit 10.

In addition, electrostatic capacitance of the capacitor 15 is set so that, when a transient voltage applied at the time of breaking the current of the main conduction unit 10 by a power semiconductor switch 2 is distributed to the protection switch 12 and the commutate switch 13 of the main conduction unit, the magnitude of the transient voltage across the protection switch 12 and the commutate switch 13 does not exceed a rated withstand voltage of the commutate switch 13 designed to have a low rated voltage and the power semiconductor switch 2 connected in parallel to the commutate switch.

In addition, a surge arrester 17 is installed on another circuit 16 connected in parallel to the main conduction path 1, the discharge path 19, and the circuit 14 where the capacitor 15 is installed.

In this configuration, closing and opening operations of the close/open switch 11, the protection switch 12, the commutate switch, and the semiconductor switch 13 are controlled according to control signals of a control unit (not shown).

With respect to the breaking operation of the DC current breaker, according to a trip signal from the control unit, the close/open switch, the protection switch, and the commutate switch simultaneously start opening operations. If a certain arc voltage is generated after the opening of the commutate switch, the power semiconductor switch connected to the commutate switch is turned on. The current flowing through the commutate switch is commutated to the power semiconductor switch, and arc between electrodes is extinguished.

In addition, the power semiconductor switch 2 is turned off according to the control signal of the control unit at the time of the current breaking operation to perform a function of breaking the current flowing through the main conduction unit 10 at a high speed within several tens of micro-seconds. When the power semiconductor switch 13 performs the current breaking, the flow of the current is commutated to the capacitor 15.

Just before the time point when the power semiconductor switch 2 breaks the current, the protection switch 12 maintains conduction by arc in the state that a certain distance between contacts is secured. When the semiconductor switch breaks the current, the arc is extinguished, and insulation between electrodes is recovered.

At this time, it is important that the breaking time point of the power semiconductor switch is appropriately set so that a transient interrupt voltage generated from the breaking time point of the power semiconductor switch 13 can be appropriately maintained between contacts (electrodes) of the protection switch 12.

Namely, the time point when the power semiconductor switch 2 is turned off according to the control signal of the control unit so that the current flowing the power semiconductor switch is completely broken is set to the time point when the distance between the electrodes of the protection switch 12 where the arc is generated is secured as the distance between the electrodes by which sufficient withstand voltage characteristic can be obtained with respect to the subsequently generated transient voltage.

In addition, due to the current commutated from the main conduction unit 10 to the capacitor 15, the capacitor is charged, and the voltage is increased. At this time, if the magnitude of the charging voltage is higher than a discharge start voltage (spark over voltage) of the surge arrester 17, the current is commutated to the surge arrester 17. Therefore, energy accumulated on a DC line is released, so that the current breaking is achieved.

In addition, at the time point when the above-described current breaking procedure is ended, the arc generated between the contacts of the close/open switch is also extinguished, so that an input/output terminal of the breaking unit is completely electrically isolated.

The discharge unit 18 is a circuit unit for preventing various phenomena which may occur due to the flow of excessive discharge current caused by the voltage charged in the capacitor 15 when the breaker is reclosed after the DC current breaking operation is ended.

In the present invention, after the current breaking operation of the main conduction unit 10 is ended, in the state that the close/open switch 11 is opened, the discharge switch is closed; and at the time of closing of the breaker, before the protection switch 12 of the main conduction unit 10 is closed, the discharge switch 20 is opened.

Figure 2:
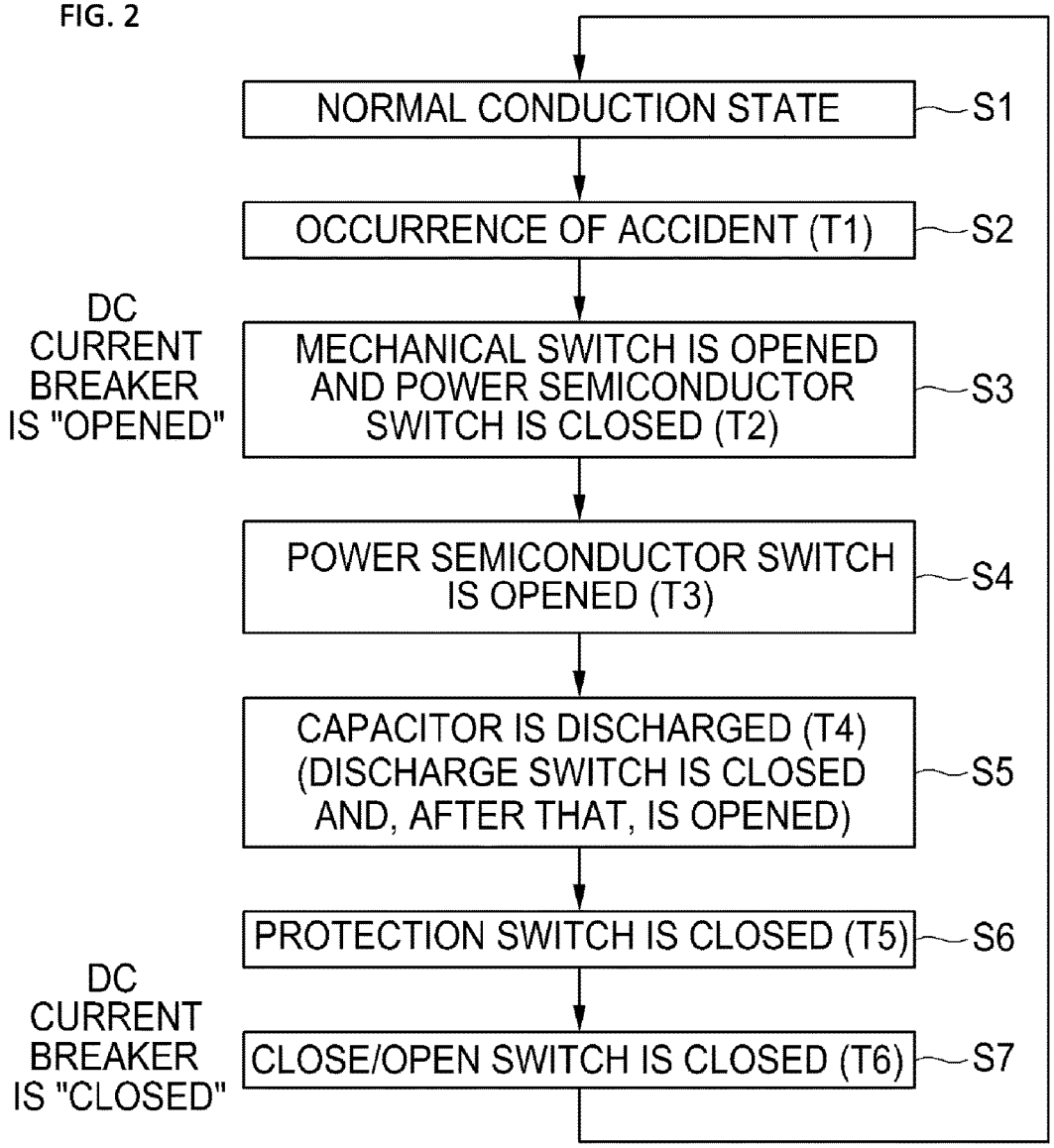
FIG. 2 is a flowchart illustrating an operating method of the DC current breaker according to the present invention.

FIG. 2 is a flowchart illustrating a method of operating the DC current breaker according to the present invention. The DC current breaking process by the breaker illustrated in FIG. 1 will be described with reference to FIG. 2.

A normal current flows through the main conduction unit 10 in a normal operation state (step S1). At a time point T1, an accident occurs on a high voltage DC line to which the DC current breaker according to the present invention is connected (step S2). At a time point T2, the close/open switch that is a high-speed mechanical switch, the protection switch, and the commutate switch is opened, and the power semiconductor switch is turned on, so that the breaking operation is started (step S3). Arc is generated between contacts of each switch, and at a time point T2', all the current of the commutate switch is commutated to the power semiconductor switch installed on the primary commutate circuit; and subsequently, at a time point T3, the power semiconductor switch is opened, so that the current breaking of the main conduction path is achieved (step S4).

Namely, the protection switch 12 is opened so that a gap between the electrodes (contacts) is generated, and just after the arc generation between the electrodes of the protection switch 12, the power semiconductor switch 13 is turned off, so that the opening operation of the main conduction path of the DC current breaker is performed.

At this time, the line current flowing through the main conduction unit 10 is commutated to the capacitor 15 installed on the secondary commutate circuit and, thus, the capacitor is charged. Therefore, the charge voltage of the capacitor 15 is increased up to the discharge start voltage of the surge arrester 17.

After the voltage of the capacitor 15 is increased, the surge arrester 17 starts to be discharged. Therefore, the line current flows through the surge arrester installed on the tertiary commutate circuit, and the energy accumulated on the line is absorbed by the surge arrester 17, and thus, the current is completely broken. Therefore, the current breaking operation of the DC current breaker is completely fulfilled.

In summary, at the time of occurrence of an accident, due to the arc voltage of the commutate switch of the main conduction unit 10, the current is commutated to the power semiconductor switch, and after that, in the state that the protection switch 12 is opened, the power semiconductor switch 2 installed on the primary commutate circuit is turned off, so that the current is primarily broken. Therefore, the current is allowed to flow into the capacitor 15 installed on the secondary commutate circuit, and thus, the capacitor 15 is charged. When the charge voltage of the capacitor is increased up to some voltage, the current is allowed to flow into the surge arrester 17 installed on the tertiary commutate circuit, and thus, all the energy of the line is absorbed. Therefore, the complete current breaking is achieved.

During the process where the current breaking operation is performed at the time of occurrence of an accident as described above, if the current flowing through the close/open switch 11 becomes zero, the arc between the electrodes is extinguished, and thus, the insulation is recovered. Therefore, at the time point T3, the complete electric isolation is achieved (step S4).

Subsequently, if the close/open switch 11 is opened, in order to prevent incorrect operation which may occur due to the flow of the excessive discharge current due to the voltage charged in the capacitor 15 at the following time of closing the breaker, the discharge switch 20 installed in the discharge path 19 is closed at the time point T4 and, after that, the discharge switch is opened, so that the voltage charged in the capacitor 15 is discharged (step S5).

Next, in the process where the current is broken in the above-described manner and, after that, the DC current breaker is closed again, at the time point T5, the protection switch 12 installed in the main conduction unit 10 is closed again (S6); and at the time T6, the close/open switch 11 is closed (S7), so that the normal conduction state that the DC current flows through the main conduction unit 10 is recovered again (the closing of the DC current breaker is completed).

Figure 3:
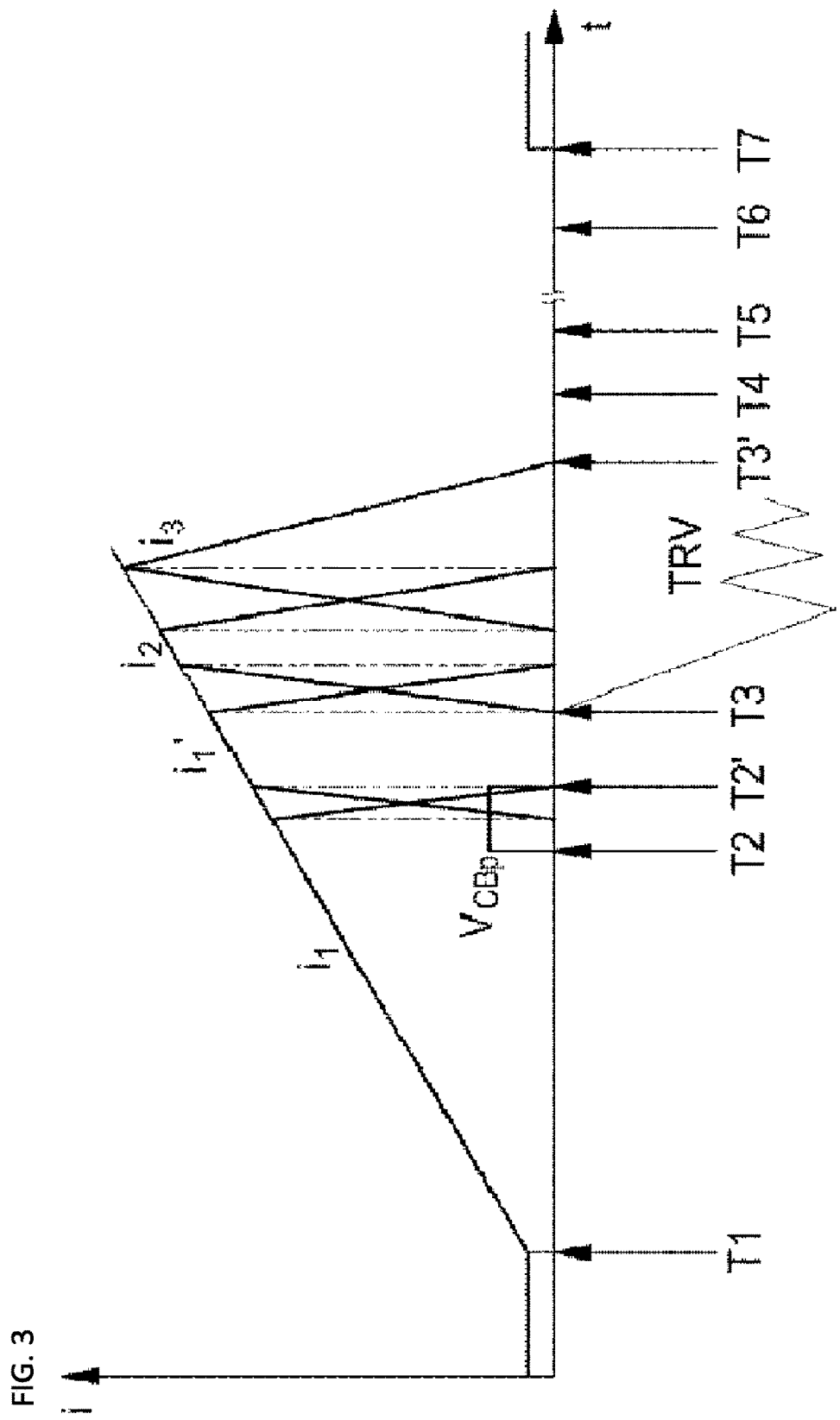
FIG. 3 is a diagram for explaining current forms according to time and a relationship between operating elements during the operation of the DC current breaker.

FIG. 3 is a diagram for explaining current forms according to time and a relationship between operating elements during the operation of the DC current breaker according to the present invention and illustrates forms of conduction current flowing through the DC current breaker at the respective operation time points illustrated in FIG. 2.

In FIG. 3, the time point T1 indicates a time point when an accident occurs; the time point T2 indicates a time point when all the three high-speed mechanical switches of the main conduction unit 10 start to be opened due to the trip signal and the power semiconductor switch is turned to the ON state; and the time point T2' indicates a time point when all the current of the main conduction unit flowing through the commutate switch is commutated to the power semiconductor switch. In this case, if the arc voltage between the electrodes of the commutate switch 13 is equal to or higher than a forward voltage of the power semiconductor switch 2 between two time points, the current of the main conduction unit starts to be commutated from the commutate switch to the power semiconductor switch 2.

The time point T3 indicates a time point when the current of the main conduction unit starts to be commutated to the capacitor 15 due to the opening operation of the power semiconductor switch. i1 indicates the current flowing through the main conduction path 1; i1' indicates the current being commutated to the power semiconductor switch; i2 indicates the current flowing through the capacitor 15; and i3 indicates the current flowing through the surge arrester 17.

The transient interrupt voltage generated at the time point T3 is applied to the two switches, that is, the protection switch 12 and the commutate switch 13 connected in series to each other in the main conduction unit 10. At the time point T3, the close/open switch of the main conduction unit 10 is opened, so that the breaking of the accident current is completed.

Figure 4:
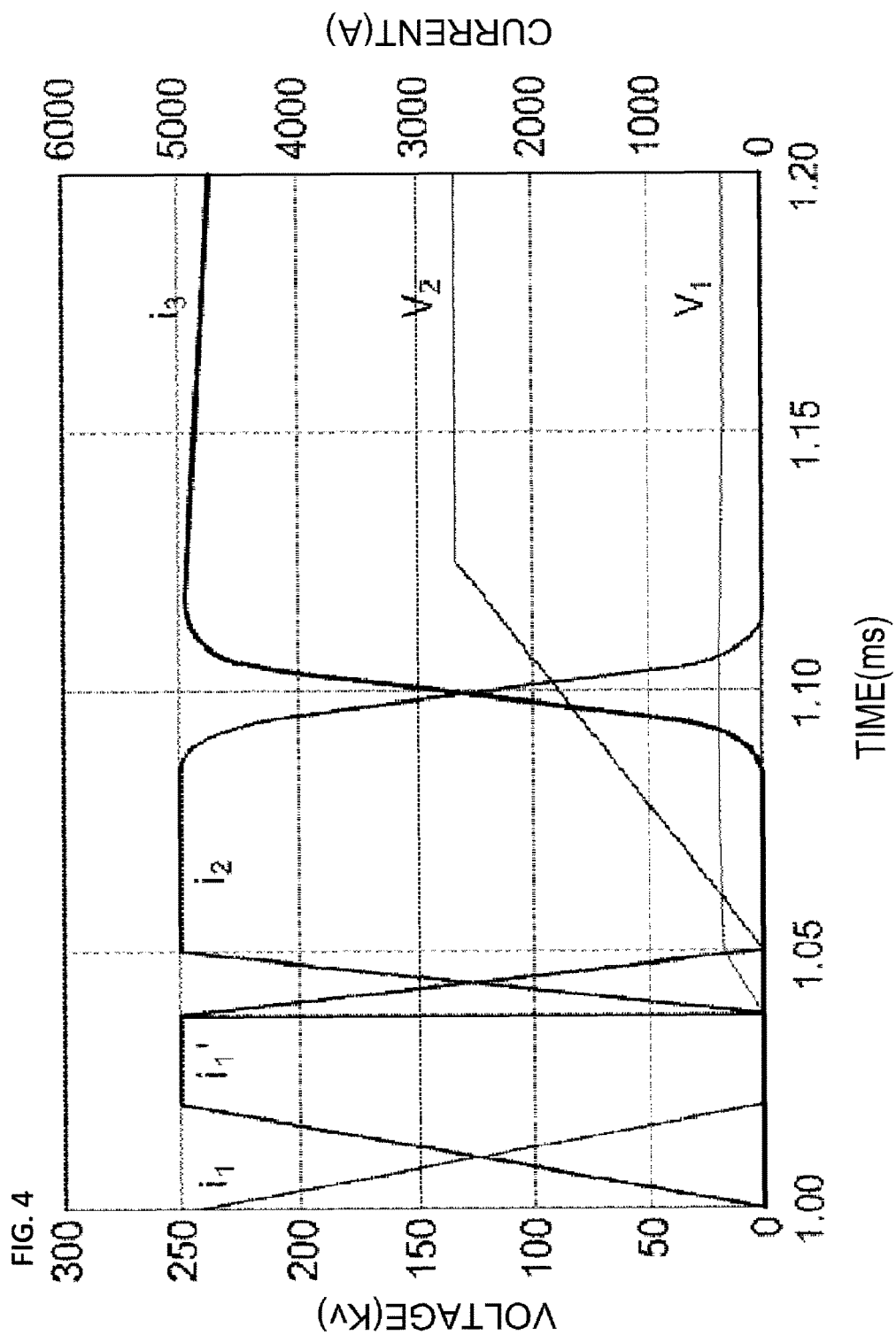
FIG. 4 is an enlarged diagram illustrating current waveforms and voltage waveforms applied to a power semiconductor switch and a high-speed mechanical switch after the time point T2 illustrated in FIG. 3.

In addition, at the time point T4, the capacitor 15 is discharged by the closing/opening operation of the discharge switch 20; at the time point T5, the protection switch 12 of the main conduction unit 10 is closed for closing of the DC current breaker; and after that, at the time point T6, the close/open switch 11 is closed, so that the current conduction in the normal operation state is achieved. The FIG. 4 is an enlarged diagram illustrating current waveforms and voltage waveforms applied to the power semiconductor switch and the high-speed mechanical switch. As illustrated in the figure, when the accident current is commutated from the main conduction unit 10 to the capacitor 15, the increased voltage (charge voltage) of the capacitor is shared by the protection switch 12 and the power semiconductor switch 13 of the main conduction unit.

Up to the time point when the current conducting the power semiconductor switch 13 is completely broken and all the current is flowed in to the capacitor 15, arc voltage exists between contacts of the protection switch 12, and at this time, most of the initial increased voltage (V1) of the capacitor 15 is applied to the power semiconductor switch 13.

In addition, if the power semiconductor switch 13 completely breaks the current, all the current is flowed into the capacitor 15, and thus, the capacitor is charged, so that the voltage is continuously increased. From the time, the protection switch 12 tries to recover insulation between the electrodes, and most of the transient interrupt voltage is shared by the protection switch. In order to do so, a voltage-shared capacitor needs to be connected in parallel to the power semiconductor switch by taking into consideration stray electrostatic capacitance of the protection switch 12 so that a voltage (V2) with a certain ratio is applied to the protection switch 12.

Figure 5:
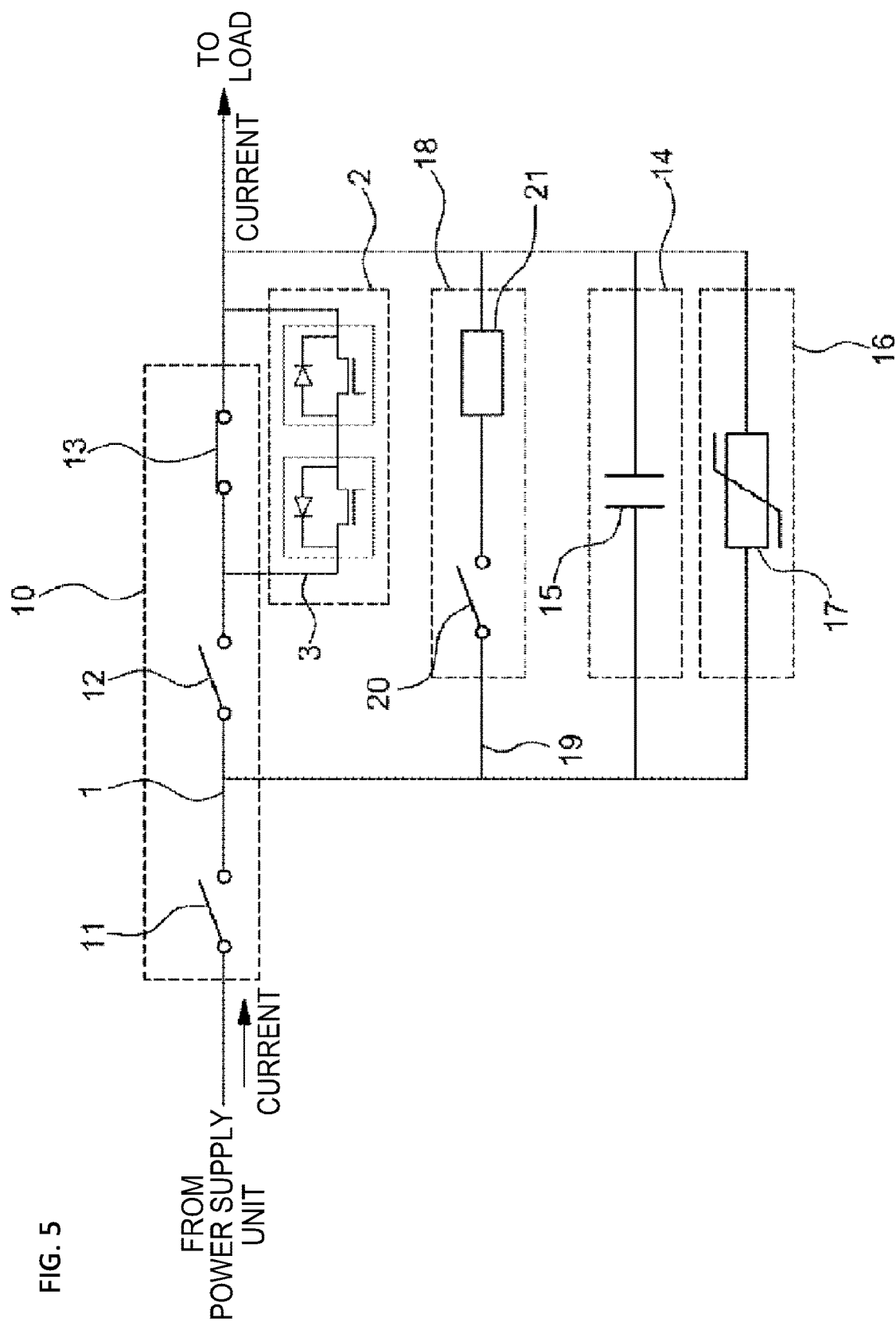
FIG. 5 is a circuit diagram illustrating a configuration of a DC current breaker according to another embodiment of the present invention, where a configuration of a breaker for bi-directional current conduction is illustrated.

On the other hand, FIG. 5 is a circuit diagram illustrating a configuration of a DC current breaker according to another embodiment of the present invention, where a configuration of a breaker for bi-directional current conduction is illustrated.

As illustrated, similarly to the embodiment of FIG. 1, in the embodiment of FIG. 5, the DC current breaker has a simple configuration where a capacitor 15, a surge arrester 17, a discharge switch 20, and a discharge resistor 21) are connected in parallel to a main conduction unit 10; and in comparison with the embodiment of FIG. 1, a conduction current is available bi-directionally.

Namely, in comparison with the embodiment of FIG. 1, in the embodiment of FIG. 5, with respect to the power semiconductor switch 13 connected in parallel to the commutate switch of the main conduction unit 10, one-directional conduction switch is replaced with a bi-directional conduction switch. Herein, the bi-directional conduction switch has a structure where two one-directional conduction switches 22 are connected reversely in series to each other.

In this configuration, the conduction currents flowing through the respective semiconductor switches 22 which are reverse to each other in terms of the conduction current direction flow through free wheeling diodes D1 and D2 connected in parallel to the reverse-directional switches of the opposite sides, so that the conduction is achieved.

In this manner, only the power semiconductor switch 13 is changed from the one-directional conduction structure to the bi-directional conduction structure, and thus, the direction of the breaking current can be expanded from one direction to the two directions (bi-directional current breaking function is available).

In addition, since the power semiconductor switch 13 used in this configuration is configured to have a withstand voltage characteristic where the withstand voltage is much lower than the rated voltage of the DC current breaker, in the embodiment of FIG. 5, the number of power semiconductor elements allowing the characteristic of conduction reverse to the existing direction in order to secure bi-directional current breaking performance can be reduced, so that cost can be reduced.

While the present invention has been particularly shown and described with reference to exemplary embodiments thereof, it will be understood by those skilled in the art that various changes in form and details may be made therein without departing from the spirit and scope of the present invention as defined by the appended claims.

The invention claimed is:

1. A DC current breaker for breaking a DC current at the time of occurrence of an accident, comprising:
   a main conduction unit including a commutate switch, a protection switch, and a close/open switch which are connected in series to each other in this order on a main conduction path where a current is flowed in a normal operation state, the protection switch protecting the commutate switch, and the close/open switch finally breaking a flow of a current of the main conduction unit;
   a power semiconductor switch connected in parallel to the commutate switch;
   a capacitor connected in parallel to the commutate switch and the protection switch; and
   a surge arrester connected in parallel to the capacitor,
   wherein the commutate switch is a mechanical switch having a rated voltage which is lower than rated voltages of the protection switch and the close/open switch,
   wherein an opening response characteristic of the commutate switch is faster than opening response characteristics of the protection switch and the close/open switch, so that an arc voltage is more speedily increased than those of the protection switch and the close/open switch,
   wherein the capacitor has electrostatic capacitance so that, when a transient voltage applied at the time point when a current of the main conduction path is broken by the power semiconductor switch is shared by the protection switch and the commutate switch, a magnitude of a transient voltage across the protection switch and the commutate switch does not exceed a limit value of a withstand voltage of the power semiconductor switch.

2. The DC current breaker according to claim 1, wherein a forward voltage of the power semiconductor switch is lower than an arc voltage generated when the commutate switch is opened in a conduction state, and the power semiconductor switch is turned on by the arc voltage generated in the commutate switch, so that a current flowing through the main conduction unit is commutated to the power semiconductor switch.

3. The DC current breaker according to claim 1, wherein the commutate switch is a monostable switch, the commutate switch receives a trip signal of the DC current breaker to start an opening operation, and after a time point when the current of the main conduction unit is completely commutated to the capacitor, the commutate switch automatically returns to a closed state.

4. The DC current breaker according to claim 1, further comprising a discharge unit for discharging a voltage charged in the capacitor after a DC current breaking operation is finally finished by the close/open switch.

5. The DC current breaker according to claim 4, wherein the discharge unit is configured to include a discharge switch and a discharge resistor which are connected in series to each other on a discharge path connected in parallel to the capacitor.

6. The DC current breaker according to claim 1, wherein the power semiconductor switch is formed with a single one-directional conduction switch or is formed by connecting two one-directional conduction switches reversely in series to each other and connecting free wheeling diodes in parallel to the respective one-directional conduction switches.

* * * * *